(12) United States Patent  
Haase et al.

(10) Patent No.: US 8,766,986 B1
(45) Date of Patent: Jul. 1, 2014

(54) EFFICIENT CACHING AND DRAWING OF OBJECTS WHOSE RENDERING PROPERTIES CHANGE FREQUENTLY

(75) Inventors: Chet Haase, Pleasanton, CA (US); Romain Guy, Millbrae, CA (US)

(73) Assignee: Google Inc., Mountain View, CA (US)

( * ) Notice: Subject to any disclaimer, the term of this patent is extended or adjusted under 35 U.S.C. 154(b) by 153 days.

(21) Appl. No.: 13/534,629

(22) Filed: Jun. 27, 2012

Related U.S. Application Data

(60) Provisional application No. 61/663,384, filed on Jun. 22, 2012.

(51) Int. Cl.
*G06T 13/00* (2011.01)
*G06G 5/00* (2006.01)
*G06F 3/00* (2006.01)
*G06F 3/048* (2013.01)

(52) U.S. Cl.
USPC ............ 345/473; 345/619; 715/762; 715/763

(58) Field of Classification Search
None
See application file for complete search history.

(56) References Cited

U.S. PATENT DOCUMENTS

| | | | |
|---|---|---|---|
| 5,600,768 A | 2/1997 | Andresen | |
| 5,805,174 A | 9/1998 | Ramchandran | |
| 5,959,867 A | 9/1999 | Speciner et al. | |
| 7,330,187 B2 | 2/2008 | Lefebvre et al. | |
| 2002/0135585 A1* | 9/2002 | Dye et al. | 345/531 |
| 2006/0055700 A1* | 3/2006 | Niles et al. | 345/473 |
| 2008/0030504 A1* | 2/2008 | Brunner et al. | 345/473 |

* cited by examiner

*Primary Examiner* — Tize Ma
(74) *Attorney, Agent, or Firm* — McDonnell Boehnen Hulbert & Berghoff LLP

(57) ABSTRACT

A display device may be operable to create a display list during rendering of a graphics object. The display device may store a set of properties of the graphics object, where the set of properties may describe how the graphics object is to be drawn on the display device. When one or more property states associated with the stored set of properties are changed, the display device may update the stored set of properties based on the property state change(s). The display device may process, utilizing the updated stored set of properties, the display list to cause a graphics module in the display device to present the graphics object, in the changed property state(s), on the display device. The set of properties may comprise translucency property and/or transform property. The transform property may comprise information on position, rotation and/or scale associated with the graphics object.

22 Claims, 4 Drawing Sheets

EFFICIENT CACHING AND DRAWING OF OBJECTS WHOSE RENDERING PROPERTIES CHANGE FREQUENTLY

CROSS-REFERENCE TO RELATED APPLICATIONS/INCORPORATION BY REFERENCE

This patent application makes reference to, claim priority to, and claims benefit from U.S. Provisional Application Ser. No. 61/663,384, which was filed on Jun. 22, 2012.

The above stated application is hereby incorporated herein by reference in its entirety.

FIELD

Certain embodiments of the disclosure relate to rendering graphics objects. More specifically, certain embodiments of the disclosure relate to a method and system for efficient caching and drawing of objects whose rendering properties change frequently.

BACKGROUND

Various graphics objects may be rendered on a display device as results from graphical operations. During rendering of a graphics object, a display list may be created and cached. The display list is an intermediate representation of the graphics object. The display list may comprise a series of graphics commands that may define an output image. The image may be rendered by executing the graphics commands.

The graphics object may comprise a plurality of properties. One or more properties of the graphics object may be changed, for example, due to animations running on an application. When one or more properties of the graphics object are changed, the cached display list may need to be recreated before it can be processed to cause a graphics module such as a graphics processing unit (GPU) in the display device to present or draw the changed graphics object.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Aspects of the present disclosure are directed to a method and system for efficient caching and drawing of objects whose rendering properties change frequently. In various embodiments of the disclosure, a display device may comprise a graphics module. The display device may be, for example, a mobile phone, a smart phone, a tablet, a laptop, a PC, a connected TV device and/or a gaming device. Various graphics objects may be rendered on the display device as results from graphical operations. During rendering of a graphics object, a display list may be created and cached. The display list is an intermediate representation of the graphics object. The created display list may then be processed and communicated to the graphics module for drawing the graphics object on the display device. The display device may store a first set of properties of the graphics object, where the first set of properties describes how the graphics object is to be drawn on the display device. When one or more property states associated with the stored first set of properties are changed, the display device may update the stored first set of properties based on the property state change(s). The display device may process, utilizing the updated stored first set of properties, the display list to cause the graphics module to present the graphics object, in the changed property state(s), on the display device.

The first set of properties may describe how the graphics object is to be drawn on the display device and may comprise, for example, translucency property and/or transform property. The graphics object may also comprise a second set of properties, where the second set of properties may describe what is to be drawn on the display device for the graphics object.

Various advantages, aspects and novel features of the present disclosure, as well as details of an illustrated embodiment thereof, will be more fully understood from the following description and drawings.

DETAILED DESCRIPTION

Certain embodiments of the disclosure can be found in a method and system for efficient caching and drawing of objects whose rendering properties change frequently. Certain specific details are set forth in the following description and in drawings to provide a thorough understanding of various embodiments of the disclosure. One skilled in the art, however, will understand that additional embodiments of the present disclosure may be practiced without several of the details described in the following description.

In various embodiments of the disclosure, a display device may be operable to create a display list during rendering of a graphics object. A first set of properties of the graphics object may be stored by the display device, where the first set of properties may describe how the graphics object is to be drawn on the display device. The display device may be operable to receive an indication that one or more property states associated with the stored first set of properties have been changed. In response to the received indication, the display device may be operable to update the stored first set of properties based on the changed one or more property states. The display device may then be operable to process, utilizing the updated stored first set of properties, the display list to cause the display device to present the graphics object, in the changed one or more property states, on the display device.

The first set of properties may describe how the graphics object is to be drawn on the display device and may comprise translucency property and/or transform property, for example. The transform property may comprise information on position, rotation and/or scale associated with said graphics object. The graphics object may also comprise a second set of properties, where the second set of properties may describe what is to be drawn on the display device for the graphics object. In this regard, the second set of properties of the graphics object may comprise information on lines, bitmaps, texts and/or other drawing primitives, for example.

In an example embodiment of the disclosure, the display list may comprise one or more drawing operations which are created for causing the display device to present or draw the graphics object on the display device. The one or more drawing operations may comprise, for example, one or more drawing commands and/or one or more associated parameters. The display device may comprise, for example, a mobile phone, a smart phone, a tablet, a laptop, a PC, a connected TV device and/or a gaming device. In another example embodiment of the disclosure, the graphics object may comprise a user interface (UI) object. In this regard, the one or more property states may be changed in instances when the UI object is under a UI animation, for example.

Figure 1:
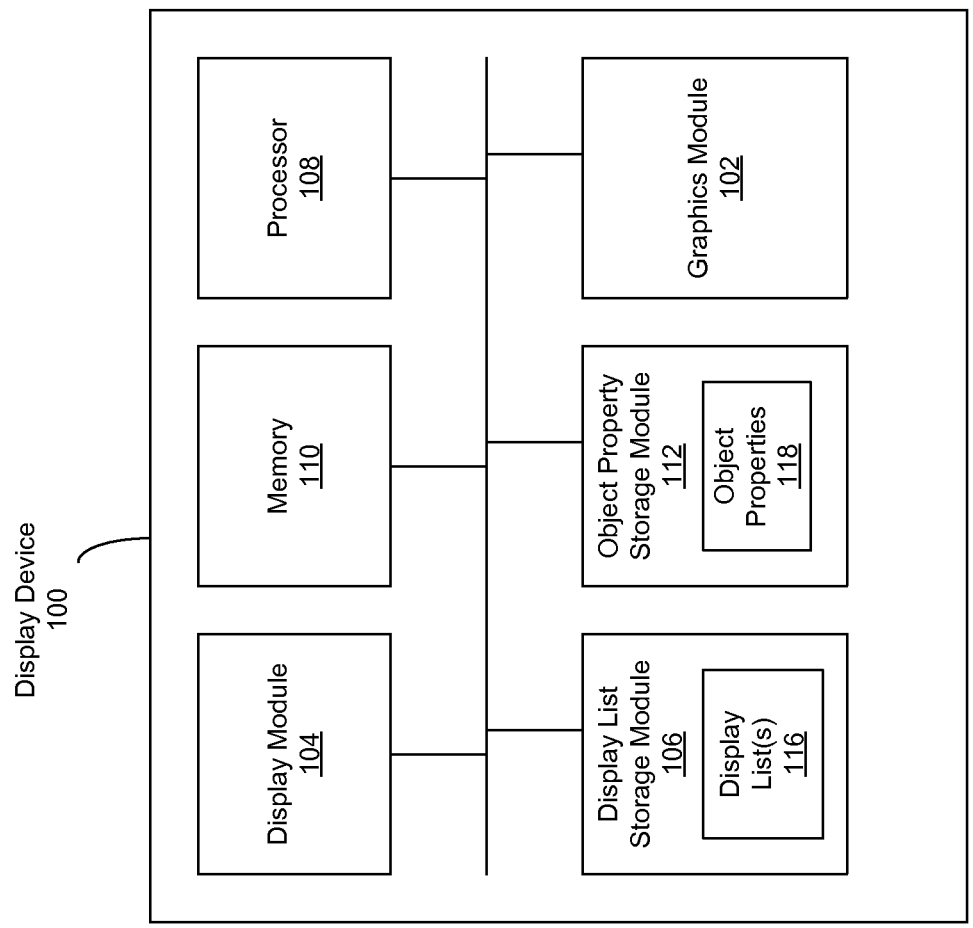
FIG. 1 is a block diagram illustrating an example display device, in accordance with an embodiment of the disclosure.

FIG. 1 is a block diagram illustrating an example display device, in accordance with an embodiment of the disclosure. Referring to FIG. 1, there is shown a display device 100. The display device 100 may comprise a graphics module 102, a display module 104, a processor 108, a memory 110, a display list storage module 106 and an object property storage module 112. The display list storage module 106 may store, for example, display list(s) 116. The object property storage module 112 may store, for example, object properties 118.

The graphics module 102 may comprise suitable logic, circuitry, interfaces and/or code that may be operable to draw or present graphics objects on the display module 104 of the display device 100. The graphics module 102 may be operable to accelerate the building of images in a frame buffer intended for output to the display module 104. The graphics module 102 may implement a plurality of application programming interfaces (APIs) such as, for example, OpenGL APIs to perform the drawing on the display module 104. In an example embodiment of the disclosure, the graphics module 102 may comprise, for example, a graphics processing unit (GPU).

The display module 104 may comprise suitable logic, circuitry, interfaces and/or code that may be operable to display or present processed content to a user of the display device 100. The display module 104 may present graphics objects which may be drawn by the graphics module 102.

The processor 108 may comprise suitable logic, circuitry, interfaces and/or code that may be operable to process signals or data. The processor 108 may be operable to manage and/or control operations of various modules or components in the display device 100. In an example embodiment of the disclosure, the processor 108 may be operable to create a display list, such as the display list 116, during rendering of a graphic object. The display list 116 may be cached in the display list storage module 106. The processor 108 may be operable to store a first set of properties, such as the object properties 118, of the graphics object in the object property storage module 112. The first set of properties 118 may comprise information which describes how the graphics object is to be drawn on the display module 104. In instances when one or more property states associated with the stored first set of properties 118 are changed, the processor 108 may be operable to update the stored first set of properties 118 based on the changed one or more property states. The processor 108 may then be operable to process, utilizing the updated stored first set of properties 118, the display list 116 to cause the graphics module 102 to present or draw the graphics object, in the changed one or more property states, on the display module 104.

The memory 110 may comprise suitable logic, circuitry, interfaces and/or code that may be operable to store information such as executable instructions and data that may be utilized by the processor 108, the display module 104 and/or the graphics module 102. The memory 110 may comprise RAM, ROM, low latency nonvolatile memory such as flash memory and/or other suitable electronic data storage.

The display list storage module 106 may comprise suitable logic, circuitry, interfaces and/or code that may be operable to store the display lists 116 such as the display list 116 associated with a graphic object. The display list 116 is an intermediate representation of the graphics object. The display list 116 may comprise one or more drawing operations which may be created for the graphics module 102 to present or draw the graphics object on the display module 104. In this regard, the one or more drawing operations may comprise one or more drawing commands and/or one or more associated parameters. For example, the drawing operations may comprise drawing commands and parameters for drawing lines, bitmaps, texts and/or other drawing primitives for the graphics object.

The object property storage module 112 may comprise suitable logic, circuitry, interfaces and/or code that may be operable to store the object properties 118 such as a first set of properties 118 associated with a graphics object, where the first set of properties 118 may describe how the graphics object is to be drawn on the display module 104. In this regard, the first set of properties 118 may comprise, for example, translucency property and/or transform property. The translucency property may also be referred to as alpha property. The translucency property may determine the degree to which a user can see through the graphics object on the display module 104. A range of transparency, varying from completely transparent (i.e., invisible) to completely opacity (i.e., no transparency), may be specified by translucency or alpha values. The transform property may define transformation information on position, rotation and/or scale associated with the graphics object displayed on the display module 104. The position attribute or property in the transform property may also be referred to as translation property. The position or translation property may determine the location or position of the graphics object to be drawn on the display module 104.

In operation, the display device 100 may comprise the graphics module 102. The display device 100 may be, for example, a mobile phone, a smart phone, a tablet, a laptop, a PC, a connected TV device and/or a gaming device. The processor 108 in the display device 100 may be operable to create a display list 116 during rendering of the graphics object. The display list 116 may be cached in the display list storage module 106 in the display device 100. A first set of properties 118 of the graphics object may be stored in the object property storage module 112 in the display device 100, where the first set of properties 118 may describe how the graphics object is to be drawn on the display module 104 in the display device 100. The processor 108 may be operable to receive an indication that one or more property states associated with the stored first set of properties 118 have been changed. In response to the received indication, the processor 108 may be operable to update the stored first set of properties 118 based on the changed one or more property states. The processor 108 may then be operable to process, utilizing the updated stored first set of properties 118, the display list 116 to cause the graphics module 102 to present the graphics object, in the changed one or more property states, on the display module 104. In such instances, the cached display list 116 may not need to be recreated before it can be processed to cause the graphics module 102 in the display device 100 to present or draw the changed graphics object on the display module 104.

The first set of properties 118 may describe how the graphics object is to be drawn on the display module 104, and may comprise translucency property and/or transform property, for example. The transform property may comprise information on position, rotation and/or scale associated with said graphics object. The graphics object may also comprise a second set of properties, where the second set of properties may describe what is to be drawn on the display module 104 for the graphics object. In this regard, the second set of properties of the graphics object may comprise information on lines, bitmaps, texts and/or other drawing primitives, for example.

In an example embodiment of the disclosure, the display list 116 may comprise one or more drawing operations which are created for the graphics module 102 to present or draw the graphics object on the display module 104. The one or more drawing operations may comprise, for example, one or more drawing commands and/or one or more associated parameters. In another example embodiment of the disclosure, the graphics object may comprise a user interface (UI) object. In this regard, the one or more property states may be changed in instances when the UI object is under a UI animation, for example.

Figure 2:
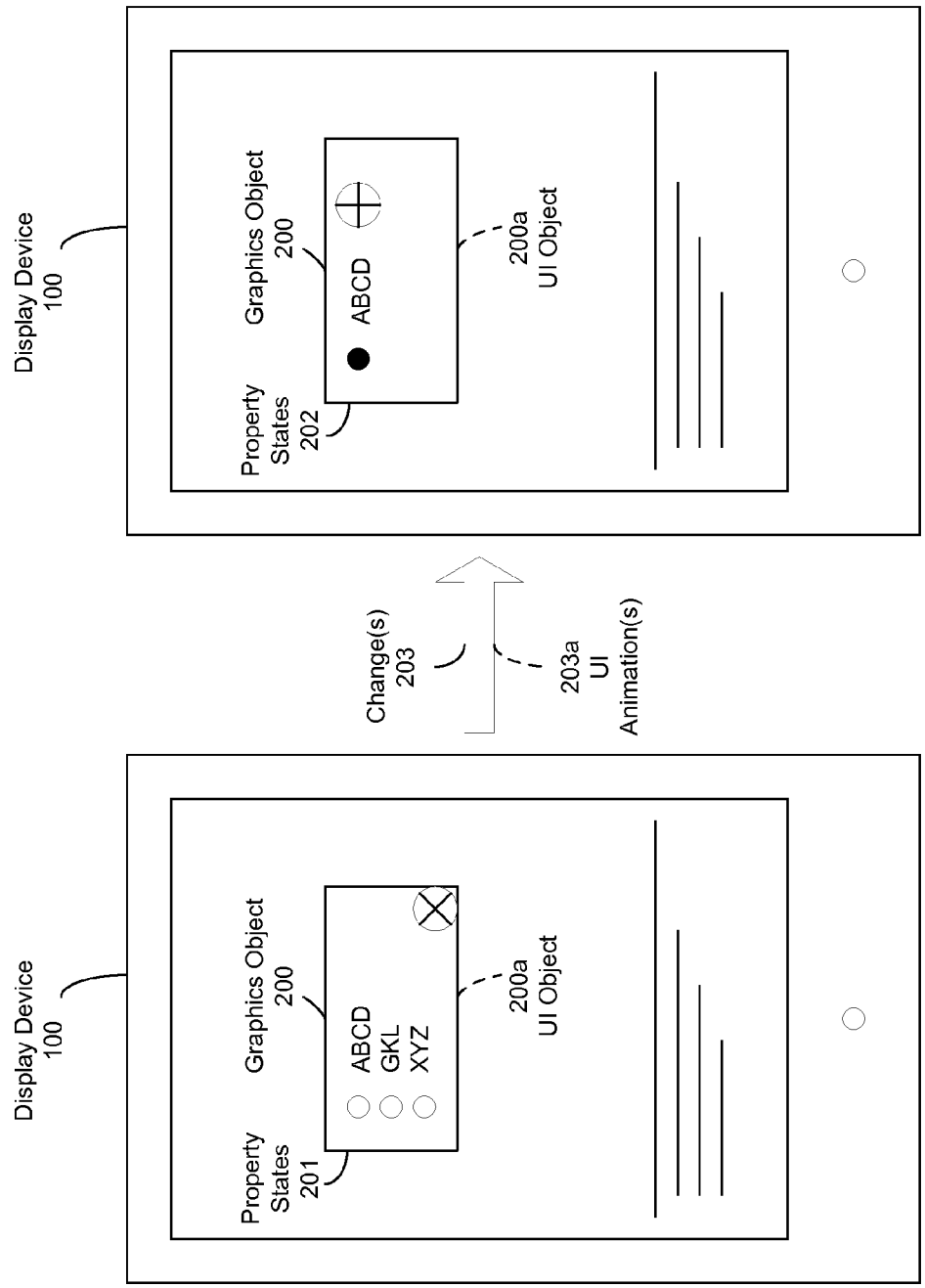
FIG. 2 is a block diagram illustrating example property state changes of a graphics object, in accordance with an embodiment of the disclosure.

FIG. 2 is a block diagram illustrating example property state changes, in accordance with an embodiment of the disclosure. Referring to FIG. 2, there is shown the display device 100 presenting a graphics object 200 in property states 201. There is also shown the display device 100 presenting the graphics object 200 in property states 202. The property states 201, 202 may correspond to the property states of the first set of properties 118 described with respect to FIG. 1. The property states 202 may be different from the property states 201 due to change(s) 203 of the graphics object 200. For example, the property states 202 may indicate that the translucency property state and/or the transform property state of the property states 201 may have been changed.

In an example operation, the processor 108 in the display device 100 may be operable to create the display list 116 during rendering of the graphic object 200 in the property states 201 of the first set of properties 118. The processor 108 may be operable to store the first set of properties 118, which are in the property states 201, in the object property storage module 112. In instances when the property states are changed from the property states 201 to the property states 202, the processor 108 may be operable to update the stored first set of properties 118 based on the change(s) 203. The processor 108 may then be operable to process, the display list 116, utilizing the updated stored first set of properties 118 in the changed property states 202, to cause the graphics module 102 in the display device 100 to present or draw the graphic object 200.

In an example embodiment of the disclosure, the graphics object 200 may comprise a UI object 200a. In such instances, the change(s) 203 may be a result of running UI animation(s) 203a. For example, the UI object 200a may be a text box or window. When running some UI animations 203a, some properties of the first set of properties 118 may be animated. When running a fading animation, for example, the translucency or alpha property may be animated to cause the translucency of the UI object 200a to increase as the UI object 200a to fade away. When running a transformation animation, the transform property may be animated to cause the change of position, rotation and/or scale of the UI object 200a, for example.

Figure 3:
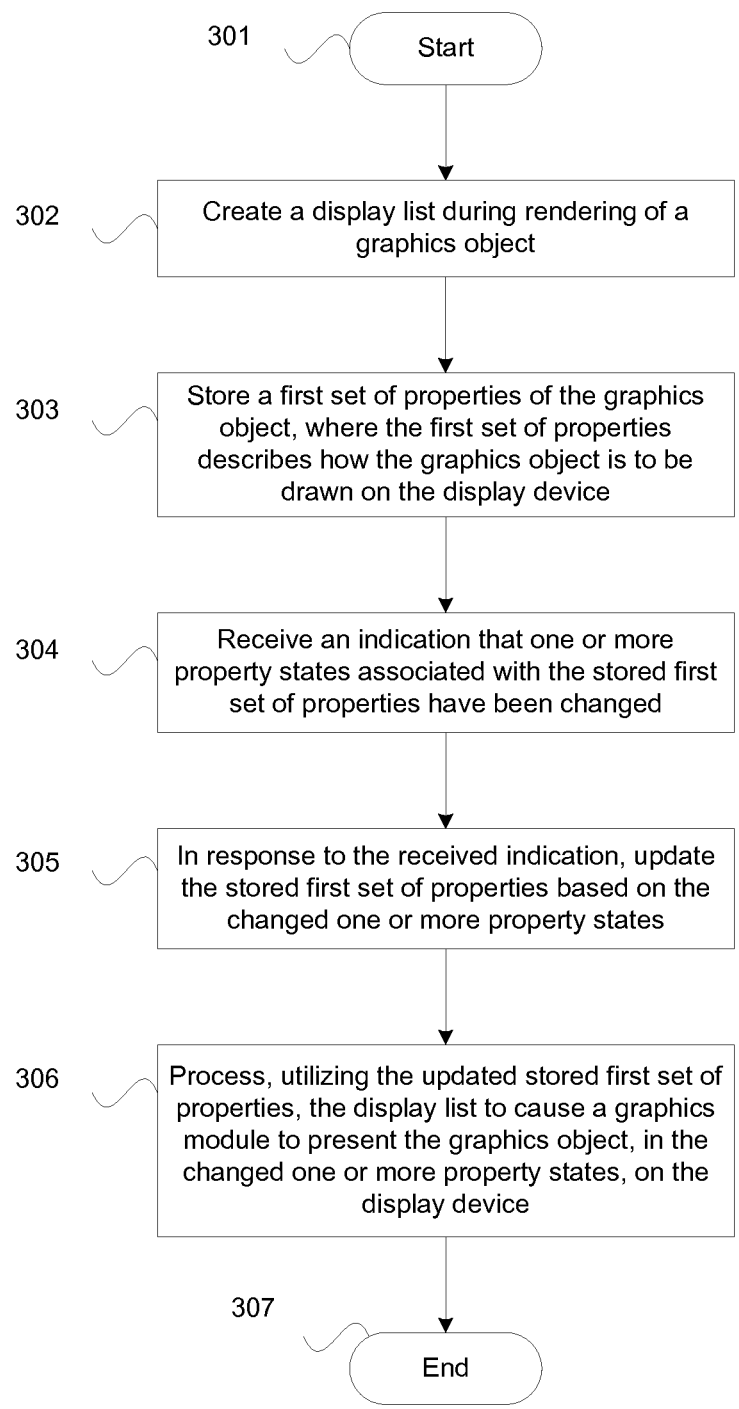
FIG. 3 is a flow chart illustrating example steps for efficient caching and drawing of graphics object whose rendering properties are changed, in accordance with an embodiment of the disclosure.

FIG. 3 is a flow chart illustrating example steps for efficient caching and drawing of graphics object whose rendering properties are changed, in accordance with an embodiment of the disclosure. Referring to FIG. 3, the example steps start at step 301. In step 302, the processor 108 in the display device 100 may be operable to create a display list 116 during rendering of a graphics object such as the graphics object 200. The display list 116 may be cached in the display list storage module 106 in the display device 100. In step 303, the processor 108 may be operable to store a first set of properties 118 of the graphics object 200 in the object property storage module 112. The first set of properties 118 may describe how the graphics object 200 is to be drawn on the display module 104 in the display device 100. The first set of properties 118 may be in the property states 201. The graphics object 200 may also comprise a second set of properties. The second set of properties may describe what is to be drawn on the display module 104 for the graphics object 200.

In step 304, the processor 108 may be operable to receive an indication that one or more property states associated with the stored first set of properties 118 have been changed. In step 305, in response to the received indication, the processor 108 may be operable to update the stored first set of properties 118 based on the changed one or more property states. In step 306, the processor 108 may be operable to process, utilizing the updated stored first set of properties 118, the display list 116 to cause a graphics module such as the graphics module 102 in the display device 100 to present or draw the graphics object 200, in the changed one or more property states, such as in the property states 202, on the display module 104 in the display device 100. The example steps may proceed to the end step 307.

Figure 4:
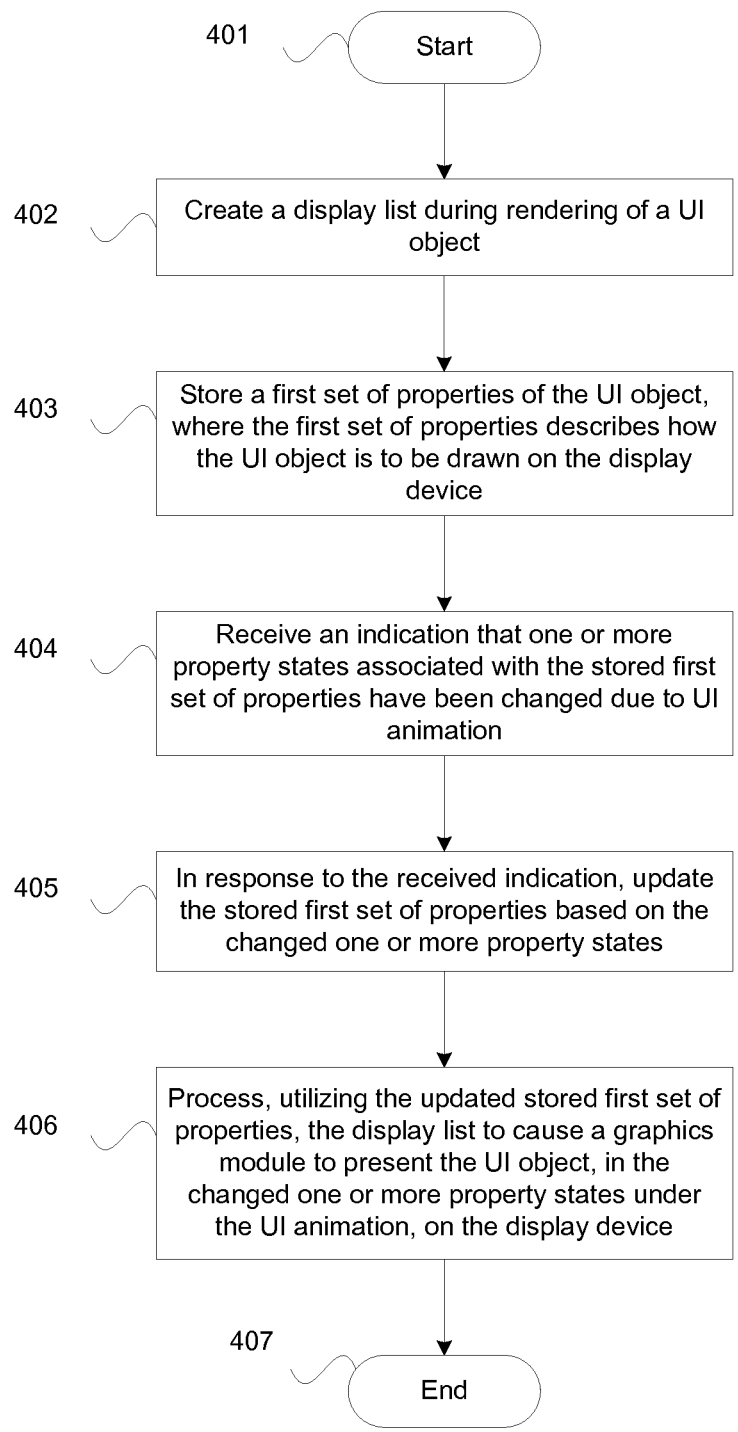
FIG. 4 is a flow chart illustrating example steps for efficient caching and drawing of UI object under UI animation, in accordance with an embodiment of the disclosure.

FIG. 4 is a flow chart illustrating example steps for efficient caching and drawing of UI object under UI animation, in accordance with an embodiment of the disclosure. Referring to FIG. 4, the example steps start at step 401. In step 402, the processor 108 in the display device 100 may be operable to create a display list such as the display list 116 during rendering of a UI object such as the UI object 200a. For example, the UI object 200a may be a text box or window. The display list 116 may be cached in the display list storage module 106 in the display device 100. In step 403, the processor 108 may be operable to store a first set of properties 118 of the UI object 200a in the object property storage module 112. The first set of properties 118 may describe how the UI object 200a is to be drawn on the display module 104 in the display device 100. The first set of properties 118 may be in the property states 201. The UI object 200a may also comprise a second set of properties. The second set of properties may describe what is to be drawn on the display module 104 for the UI object 200a.

In step 404, the processor 108 may be operable to receive an indication that one or more property states associated with the stored first set of properties 118 have been changed due to, for example, a UI animation 203a. In step 405, in response to the received indication, the processor 108 may be operable to update the stored first set of properties 118 based on the changed one or more property states. In step 406, the processor 108 may be operable to process, utilizing the updated stored first set of properties 118, the display list 116 to cause a graphics module such as the graphics module 102 in the display device 100 to present or draw the UI object 200a, in the changed one or more property states, such as in the property states 202, under the UI animation 203a on the display module 104 in the display device 100. The example steps may proceed to the end step 407.

In various embodiments of the disclosure, a display device such as the display device 100 may comprise a graphics module such as the graphics module 102. The display device 100 may be, for example, a mobile phone, a smart phone, a tablet, a laptop, a PC, a connected TV device and/or a gaming device. The processor 108 in the display device 100 may be operable to create a display list 116 during rendering of a graphics object such as the graphics object 200. The display list 116 may be cached in the display list storage module 106 in the display device 100. A first set of properties 118 of the graphics object 200 may be stored, by the processor 108, in the object property storage module 112 in the display device 100. The first set of properties 118 may be, for example, in the property states 201. The first set of properties 118 may describe how the graphics object 200 is to be drawn on the display module 104 in the display device 100. The processor 108 may be operable to receive an indication that one or more property states associated with the stored first set of properties 118 have been changed. In response to the received indication, the processor 108 may be operable to update the stored first set of properties 118 based on the changed one or more property states. The processor 108 may then be operable to process, utilizing the updated stored first set of properties 118, the display list 116 to cause the graphics module 102 to present the graphics object 200, in the changed one or more property states, such as in the property states 202, on the display module 104.

The first set of properties 118 may describes how the graphics object 200 is to be drawn on the display module 104 and may comprise translucency property and/or transform property, for example. The transform property may comprise information on position, rotation and/or scale associated with said graphics object 200. The graphics object 200 may also comprise a second set of properties, where the second set of properties may describe what is to be drawn on the display module 104 for the graphics object 200. In this regard, the second set of properties of the graphics object may comprise information on lines, bitmaps, texts and/or other drawing primitives, for example.

In an example embodiment of the disclosure, the display list 116 may comprise one or more drawing operations which are created for the graphics module 102 to present or draw the graphics object 200 on the display module 104. The one or more drawing operations may comprise, for example, one or more drawing commands and/or one or more associated parameters. In another example embodiment of the disclosure, the graphics object may comprise a UI object such as the UI object 200*a*. In this regard, the one or more property states may be changed in instances when the UI object 200*a* is under, for example, a UI animation such as the UI animation 203*a*.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for efficient caching and drawing of objects whose rendering properties change frequently.

Accordingly, aspects of the present disclosure may be realized in hardware, software, or a combination of hardware and software. Aspects of the present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
in a display device:
    creating a display list during rendering of a graphics object, wherein the display list comprises a series of graphics commands for causing a graphics module to present the graphics object on the display device, wherein the display list is stored for subsequent execution during a subsequent rendering of the graphics object;
    storing, separate from the display list, property states of a set of dynamic properties of the graphics object, wherein the set of dynamic properties comprises a position of the graphics object and a translucency of the graphics object;
    receiving an indication that one or more of the property states of the set of dynamic properties have been changed;
    in response to the received indication, updating the stored property states of the set of dynamic properties based on the one or more changed property states; and
    processing, utilizing the updated stored property states of the set of dynamic properties, the same display list to cause the graphics module to present the graphics object on the display device, such that the graphics object is rendered according to the one or more changed property states without recreation of the display list.

2. The method according to claim 1, wherein the position of the graphics object comprises a translation, rotation, and scale of the graphics object.

3. The method according to claim 1, wherein the series of graphics commands comprises operations and associated parameters for rendering lines, bitmaps, texts and/or other drawing primitives to present an image of the graphics object.

4. The method according to claim 1, wherein the graphics object comprises a user interface (UI) object.

5. The method according to claim 4, wherein the one or more property states are changed when the UI object is under a UI animation.

6. The method according to claim 1, wherein the display device comprises a mobile phone, a smart phone, a tablet, a laptop, a PC, a connected TV device and/or a gaming device.

7. The method according to claim 1, wherein the series of graphics commands comprises a group of application programming interface (API) rendering commands used to interact with the graphics module.

8. A system, comprising:
a display device, the display device being operable to:
  create a display list during rendering of a graphics object, wherein the display list comprises a series of graphics commands for causing a graphics module to present the graphics object on the display device, wherein the display list is stored for subsequent execution during a subsequent rendering of the graphics object;
  store, separate from the display list, property states of a set of dynamic properties of the graphics object, wherein the set of dynamic properties comprises a position of the graphics object and a translucency of the graphics object;
  receive an indication that one or more of the property states of the set of dynamic properties have been changed;
  in response to the received indication, update the stored property states of the set of dynamic properties based on the one or more changed property states; and
  process, utilizing the updated stored property states of the set of dynamic properties, the same display list to cause the graphics module to present the graphics object on the display device, such that the graphics object is rendered according to the one or more changed property states without recreation of the display list.

9. The system according to claim 8, wherein the position of the graphics object comprises a translation, rotation, and scale of the graphics object.

10. The system according to claim 8, wherein the series of graphics commands comprises operations and associated parameters for rendering lines, bitmaps, texts and/or other drawing primitives to present an image of the graphics object.

11. The system according to claim 8, wherein the graphics object comprises a user interface (UI) object.

12. The system according to claim 11, wherein the one or more property states are changed when the UI object is under a UI animation.

13. The system according to claim 8, wherein the series of graphics commands comprises a group of application programming interface (API) rendering commands used to interact with the graphics module.

14. A non-transitory computer readable medium having stored thereon, a computer program having at least one code section, the at least one code section being executable by a computer for causing the computer to perform steps comprising:
  in a display device:
    creating a display list during rendering of a user interface (UI) object, wherein the display list comprises a series of graphics commands for causing a graphics module to present the UI object on the display device, wherein the display list is stored for subsequent execution during a subsequent rendering of the UI object;
    storing, separate from the display list, property states of a set of dynamic properties of the UI object, wherein the set of dynamic properties comprises a position of the UI object and a translucency of the UI object;
    receiving an indication that one or more of the property states of the set of dynamic properties have been changed due to UI animation;
    in response to the received indication, updating the stored property states of the set of dynamic properties based on the one or more changed property states; and
    processing, utilizing the updated stored property states of the set of dynamic properties, the same display list to cause the graphics module to present the UI object on the display device, such that the UI object is rendered according to the one or more changed property states without recreation of the display list.

15. The non-transitory computer readable medium according to claim 14, wherein the series of graphics commands comprises a group of application programming interface (API) rendering commands used to interact with the graphics module.

16. A display device, comprising:
at least one processor: and
  a memory containing executable instructions that, when executed by the at least one processor, cause the display device to perform a method, the method comprising:
    creating a display list during rendering of a graphics object, wherein the display list comprises a series of graphics commands for causing a graphics module to present the graphics object on the display device, wherein the display list is stored for subsequent execution during a subsequent rendering of the graphics object;
    storing, separate from the display list, property states of a set of dynamic properties of the graphics object, wherein the set of dynamic properties comprises a position of the graphics object and a translucency of the graphics object;
    receiving an indication that one or more of the property states of the set of dynamic properties have been changed;
    in response to the received indication, updating the stored property states of the set of dynamic properties based on the one or more changed property states; and
    processing, utilizing the updated stored property states of the set of dynamic properties, the same display list to cause the graphics module to present the graphics object on the display device, such that the graphics object is rendered according to the one or more changed property states without recreation of the display list.

17. The display device according to claim 16, wherein the position of the graphics object comprises a translation, rotation, and scale of the graphics object.

18. The display device according to claim 16, wherein the series of graphics commands comprises operations and associated parameters for rendering lines, bitmaps, texts and/or other drawing primitives to present an image of the graphics object.

19. The display device according to claim 16, wherein the graphics object comprises a user interface (UI) object.

20. The display device according to claim 19, wherein the one or more property states are changed when the UI object is under a UI animation.

21. The display device according to claim 16, wherein the display device comprises a mobile phone, a smart phone, a tablet, a laptop, a PC, a connected TV device and/or a gaming device.

22. The display device according to claim 16, wherein the series of graphics commands comprises a group of application programming interface (API) rendering commands used to interact with the graphics module.

* * * * *